United States Patent
Dingl et al.

(10) Patent No.: US 7,357,127 B2
(45) Date of Patent: Apr. 15, 2008

(54) METHOD FOR DETERMINING THE AIR MASS IN A CYLINDER

(75) Inventors: Jürgen Dingl, Regensburg (DE); Gerhard Eser, Hemau (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/629,371

(22) PCT Filed: Mar. 30, 2005

(86) PCT No.: PCT/EP2005/051438

§ 371 (c)(1), (2), (4) Date: Dec. 12, 2006

(87) PCT Pub. No.: WO2006/000474

PCT Pub. Date: Jan. 5, 2006

(65) Prior Publication Data

US 2007/0227500 A1   Oct. 4, 2007

(30) Foreign Application Priority Data

Jun. 24, 2004 (DE) .................. 10 2004 030 604

(51) Int. Cl.
*F02D 41/18* (2006.01)

(52) U.S. Cl. .................................................. 123/684

(58) Field of Classification Search ............... 123/435, 123/684

See application file for complete search history.

(56) References Cited

U.S. PATENT DOCUMENTS

| | | | | |
|---|---|---|---|---|
| 4,269,156 A | * | 5/1981 | Drellishak | ............. 123/478 |
| 4,404,946 A | * | 9/1983 | Hoard et al. | ............. 123/486 |
| 4,941,448 A | * | 7/1990 | Nakaniwa et al. | ......... 123/488 |
| 6,675,579 B1 | * | 1/2004 | Yang | ............. 123/435 |
| 6,840,237 B2 | * | 1/2005 | Strom et al. | ............. 123/679 |
| 2007/0062490 A1 | * | 3/2007 | Yang | ............. 123/435 |

FOREIGN PATENT DOCUMENTS

| | | |
|---|---|---|
| DE | 43 25 902 A1 | 2/1995 |
| DE | 100 51 416 A1 | 5/2001 |
| DE | 100 51 425 A1 | 5/2001 |
| DE | 100 50 059 A1 | 6/2001 |

(Continued)

OTHER PUBLICATIONS

E. Bach, "Verbrennungsmotoren Lehrbrief 7, Leistungssteigerung von Verbrennungsmotoren", Oct. 16, 2002, pp. 1-61, Hochschule für Technik und Wirtschaft, Dresden (FH).

*Primary Examiner*—Erick Solis

(57) ABSTRACT

The method for determining an air mass in a cylinder of an internal combustion engine with a supercharging device and with a device for variably controlling the valve overlap of the gas exchange valves is characterized by a reference characteristic curve for the air mass inside the cylinder that, according to the operating conditions, defines a linear correlation between the air mass inside the cylinder and the pressure inside the induction pipe, and when the induction pipe pressure exceeds the exhaust counter pressure, the value of the air mass from the reference characteristic curve is corrected with a value for the supercharging rate that is defined as the characteristic curve according to the operating conditions above the pressure inside the induction duct.

9 Claims, 1 Drawing Sheet

FOREIGN PATENT DOCUMENTS

| | | |
|---|---|---|
| DE | 102 59 052 B3 | 4/2004 |
| DE | 103 16 291 B3 | 11/2004 |
| DE | 10 2004 050 059 A1 | 4/2006 |
| EP | 0 651 149 A1 | 5/1995 |
| EP | 1 041 264 A2 | 10/2000 |
| EP | 1 231 372 A2 | 8/2002 |
| EP | 1 243 779 A2 | 9/2002 |

* cited by examiner

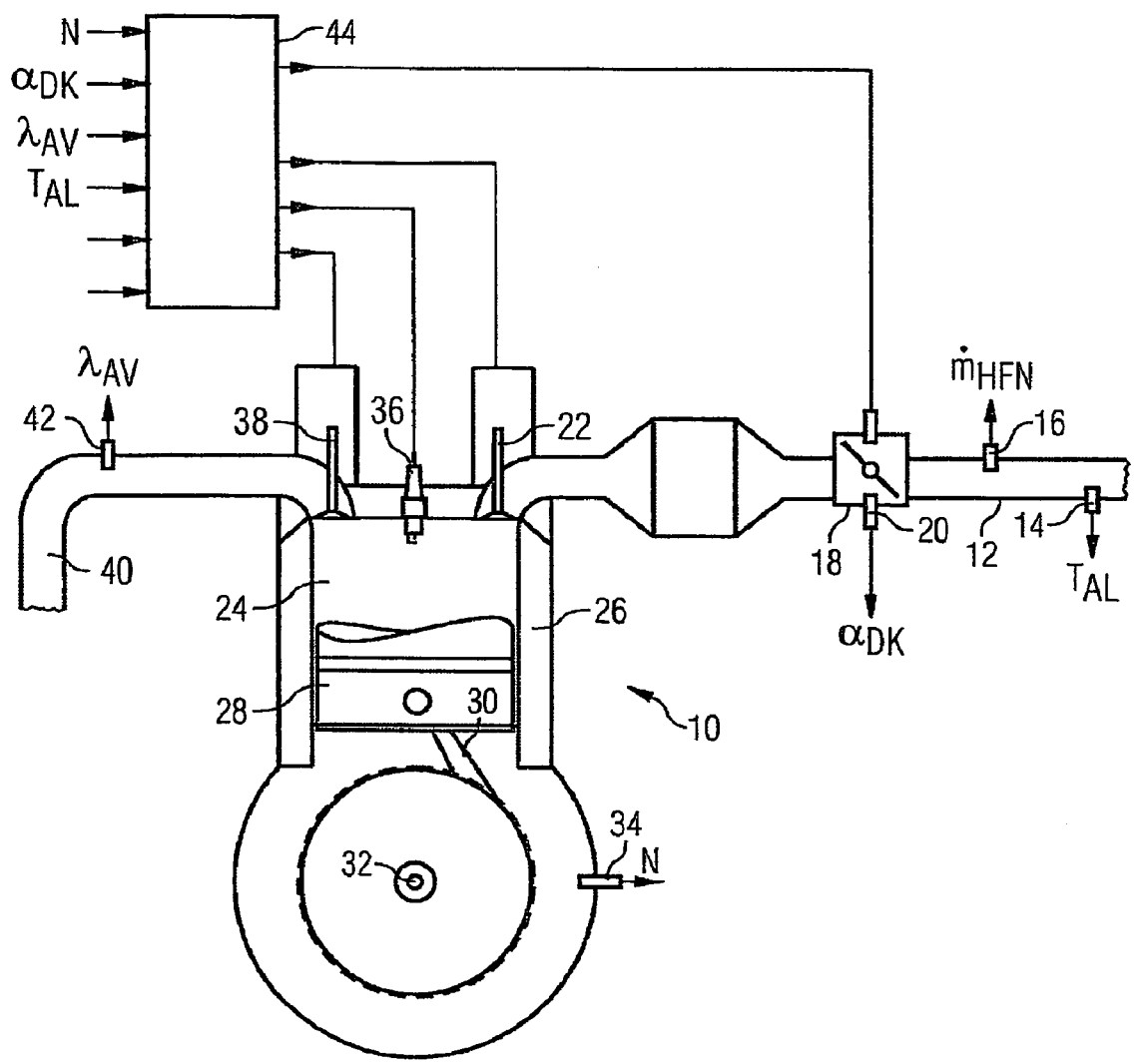
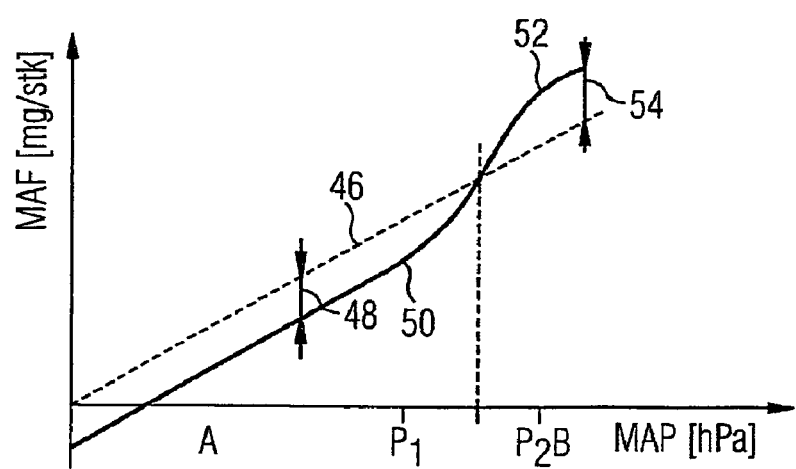

METHOD FOR DETERMINING THE AIR MASS IN A CYLINDER

CROSS REFERENCE TO RELATED APPLICATIONS

This application is the US National Stage of International Application No. PCT/EP2005/051438, filed Mar. 30, 2005 and claims the benefit thereof. The International Application claims the benefits of German Patent application No. 10 2004 030 604.4 filed Jun. 24, 2004. All of the applications are incorporated by reference herein in their entirety.

FIELD OF INVENTION

The present invention relates to a method for determining the air mass in a cylinder of an internal combustion engine with a supercharging device and a facility for variable activation of the valve overlap of the gas exchange valves.

BACKGROUND OF THE INVENTION

A cylinder air charge controller is known from DE 100 50 059 A1, which adjusts inlet and outlet valves as a function of a required torque. When a turbocharger is used, it is proposed that the control device for inlet and outlet valves should be opened at the same time to prevent the delay in the torque increase, such that where there is a positive pressure difference between the intake and exhaust gas sides, there is a purging of intake air to the exhaust gas side.

A method for controlling an engine is known from DE 100 51 416 A1, which has an electronically controlled inlet and outlet device. To change the air/fuel ratio in the individual cylinders quickly, the outlet regulator is used to control the air flow from the intake manifold into the cylinder.

An engine control system for a direct injection unit with variable valve control time is known from DE 100 51 425 A1, in which fresh air charging into the cylinder is controlled more rapidly with the aid of a cam controller. The method also includes changing the air/fuel ratio in the cylinder and changes the activation of the outlet control device accordingly. A manifold pressure sensor is provided to compensate for incorrect calculations and calculates a pressure error from the difference between the determined manifold pressure and the current manifold pressure.

A direct-injection internal combustion engine with a turbocharger to reduce consumption, particularly in full-load operation is known from EP 1 243 779 A2. To prevent knocking noises, residual gas is purged from the cylinder, in that the gas exchange valves are opened at the same time.

SUMMARY OF INVENTION

The object of the invention is to provide a method for determining the air mass in a cylinder of an internal combustion engine, which determines the air mass available to the cylinder reliably using simple means.

According to the invention the object is achieved by a method with the features from the claims. Advantageous embodiments are set out in the subclaims.

The inventive method relates to internal combustion engines with a supercharging device, for example an exhaust gas turbocharger, and a facility for variable activation of a valve overlap of the gas exchange valves. The inventive method operates with at least two characteristic curves. The first characteristic curve shows the air mass in the cylinder as the first reference characteristic curve, describing a linear relationship between the air mass in the cylinder and the pressure in the intake pipe as a function of the operating conditions. If the intake pipe pressure exceeds the exhaust gas counterpressure, a value for the trapping efficiency is determined based on a second characteristic curve and used to correct the value of the air mass from the reference characteristic curve. With the inventive method the air mass in the cylinder is described by a linear relationship between the air mass and the pressure in the intake duct. The air values are corrected with the aid of the trapping efficiency [lacuna] purging, in other words in the region where the intake pressure is greater than the exhaust gas counterpressure.

The trapping efficiency (TE) is preferably defined as follows:

$$TE = \frac{m_{cyl}}{m_{eng}}$$

where $m_{cyl}$ is the air mass remaining in the cylinder after the charge exchange and $m_{eng}$ is the total air mass leaving the cylinder during the charge exchange. The ratio of these air masses is particularly suitable for characterizing the purge effect in the cylinder. The value from the reference characteristic curve is corrected by multiplication.

In a preferred development of the inventive method, if the intake pipe pressure is less than or equal to the exhaust gas counterpressure, the value of the air mass from the reference characteristic curve is corrected using a value for the residual gas remaining in the combustion chamber. For example the air mass is defined for the residual gas in a characteristic curve as a function of operating conditions over the pressure in the intake duct, such that the value for the residual gas is subtracted from the reference characteristic curve to correct the value. The characteristic curve for the air mass of the residual gas preferably runs below a predetermined pressure value in a manner that is essentially proportional to the intake pipe pressure.

In a preferred development at least one of the additional operating conditions, of which the characteristic curve for the trapping efficiency and/or the residual gas is a function, is selected from the following group:

rotation speed, valve control times and ambient temperature and/or pressure.

In a particularly preferred embodiment the value for the trapping efficiency is forwarded to a control unit for calculation of the torque and/or ignition correction. It has proven particularly advantageous for the value for the air mass in the cylinder and the correction value defined by purging to be forwarded separately to lower-order control units, instead of a corrected value for the air mass in the cylinder directly.

BRIEF DESCRIPTION OF THE DRAWING

The inventive method is described in more detail below with reference to two figures, in which:

FIG. 1 shows a schematic view of an internal combustion engine and

FIG. 2 shows the pattern of the air mass flowing into a cylinder as a function of the intake pipe pressure.

DETAILED DESCRIPTION OF INVENTION

FIG. 1 shows an internal combustion engine 10 with one cylinder 26. Naturally the inventive method can also be used with internal combustion engines with more than one cylinder. Fresh air is taken in by way of an intake duct 12, the temperature ($T_{AL}$) of said fresh air being captured by way of a temperature sensor 14. The incoming air mass is measured for example using an air mass sensor 16. It is also possible to provide a pressure sensor as the load sensor instead of the air mass sensor, said pressure sensor being positioned between a throttle valve 18 and an inlet valve 22. The throttle valve 18 controls the air mass flow into the inlet duct 12, with a sensor 20 capturing the angular position of the throttle valve for more precise regulation.

The fresh air enters the inner chamber 24 of the cylinder by way of the inlet valve 22. The cylinder 26 is illustrated schematically and has a piston 28 with a connecting rod 30, which drives the crankshaft 32. The rotation speed of the crankshaft is captured by a speed sensor 34.

Fuel injection is not shown in further detail in the figures. The injected fuel is ignited by way of the ignition facility 36. After ignition the residual gas is released by way of the outlet valve 38 into the exhaust gas duct 40. A lambda probe 42 measures the oxygen contained in the exhaust gas in the exhaust gas duct.

The internal combustion engine is controlled by way of an engine controller 44, at which the rotation speed N, the throttle valve angle $\alpha_{DK}$, the oxygen content $\lambda_{AV}$ and the ambient temperature $T_{AL}$ of the fresh air taken in are for example present as input variables. The measured value for the fresh air taken in $dm_{HFN}/dt$ is also present at the engine controller 44.

FIG. 2 shows the model approach to the air mass flow into the cylinder as a function of the pressure in the intake pipe (MAP). If the pressure in the intake pipe is less than the exhaust gas counterpressure, the values in the interval A in FIG. 2 result. If the intake pipe pressure is greater than the exhaust gas counterpressure, the pressure values are in the interval B. FIG. 2 shows a standard absorption characteristic curve 46, describing the linear relationship between the air mass in the cylinder (MAF0 and the pressure in the intake pipe (MAP). The standard absorption characteristic curve 46 does not take into account the effects occurring due to valve overlap.

In the interval A a value 48 for the residual gas remaining in the cylinder is subtracted from the standard absorption characteristic curve 46. As well as subtraction, it is of course also possible to consider a multiplying factor. FIG. 2 shows the result 50 of the correction. Below a first critical value P1 the air mass MAF has an essentially linear pattern as a function of the intake pressure MAP, said pattern showing the same slope as the standard absorption characteristic curve 46.

In the interval B the mass of air remaining in the cylinder is above the standard absorption characteristic curve 46. Above a critical value P2, the values of the air mass 52 here have an essentially linear pattern, parallel to the standard absorption characteristic curve 46. The increase 54 due to the air mass remaining in the combustion chamber as a result of purging can be different from the air mass occurring in the interval A, which lowers the standard absorption characteristic curve 46.

In the transition area between P1 and P2 the corrected curve has an essentially non-linear, S-shaped pattern.

In a further embodiment of the invention the trapping efficiency is recorded by way of characteristic maps as a function of the position of the valve drive, the engine speed, the intake pipe pressure and the exhaust gas counterpressure. Depending on the embodiment, the trapping efficiency and then the exhaust gas counterpressure may or may not be taken into account during the determination. In one specific embodiment the trapping efficiency (EFF_TRAP) is a function of the engine speed N, the valve overlap VO, the exhaust gas counterpressure PRS_EX, the intake pipe pressure MAP and a selector switch LC_PRS_EX_SCAV_C-CC_ENA, which indicates whether the exhaust gas counterpressure is included in the calculation.

The invention claimed is:

1. A method for determining an air mass in a cylinder of an internal combustion engine with a supercharging device and a facility for variable activation of a valve overlap of a plurality of gas exchange valves, comprising:
    defining a reference characteristic curve for the air mass in the cylinder where the characteristic curve describes a linear relationship between the air mass in the cylinder and a pressure in an intake pipe of the engine as a function of operating conditions of the engine; and
    correcting the value of the air mass from the reference characteristic curve using a value for the trapping efficiency if the intake pipe pressure exceeds the exhaust gas counter pressure, wherein the trapping efficiency is a characteristic curve defined as a function of the operating conditions over the pressure in the intake pipe.

2. The method as claimed in claim 1, wherein the trapping efficiency is defined as a quotient of an air mass remaining in the cylinder after a charge exchange and a total air mass leaving the cylinder during the charge exchange.

3. The method as claimed in claim 1, wherein if the intake pipe pressure is less than or equal to the exhaust gas counter pressure, the value of the air mass from the reference characteristic curve is corrected using a value for a residual gas remaining in the combustion chamber, with the air mass for the residual gas being defined in the characteristic curve as a function of the operating conditions over the pressure in the intake pipe.

4. The method as claimed in claim 3, wherein the characteristic curve for the air mass of the residual gas runs below a predetermined pressure value and is proportional to the intake pipe pressure.

5. The method as claimed in claim 1, wherein the characteristic curve for the trapping efficiency is essentially proportional to the intake pipe pressure.

6. The method as claimed in claim 1, wherein at least one of the operating conditions where the characteristic curves for the trapping efficiency or the residual gas are a function of the operating conditions, is selected from the group consisting of: rotation speed, valve control times, ambient temperature, and ambient pressure.

7. The method as claimed in claim 1, wherein the trapping efficiency characteristic curve is transmitted as an electrical signal to a control unit for calculation of a torque correction value or ignition correction value.

8. The method as claimed in claim 1, wherein the trapping efficiency characteristic curve is transmitted as an electrical signal to a control unit for calculation of a torque correction value and ignition correction value.

9. An internal combustion engine, comprising:
    an engine block having a plurality of cylinders defined within the block;
    a crank shaft arranged in the engine block below the cylinders;

a plurality of pistons arranged in the cylinders and connected to the crank shaft;

a cylinder head arranged on the engine block opposite the crank shaft and forming a combustion chamber;

a plurality of inlet valves arranged in the cylinder head that regulate the inlet of an inlet flow into the combustion chamber;

a plurality of exhaust valves arranged in the cylinder head that regulate the outlet of an exhaust flow out of the combustion chamber;

an intake pipe connected to the cylinder head to provide an inlet flow to the cylinders; and a control unit that:
  defines a reference characteristic curve for an air mass in the cylinder where the reference characteristic curve describes a linear relationship between the air mass in the cylinder and a pressure in the intake pipe as a function of operating conditions of the engine, and corrects the value of the air mass from the reference characteristic curve using a value for a trapping efficiency if the intake pipe pressure exceeds the exhaust gas counter pressure, wherein the trapping efficiency is a characteristic curve defined as a function of the operating conditions over the pressure in the intake pipe.

* * * * *